Patented Nov. 11, 1924.

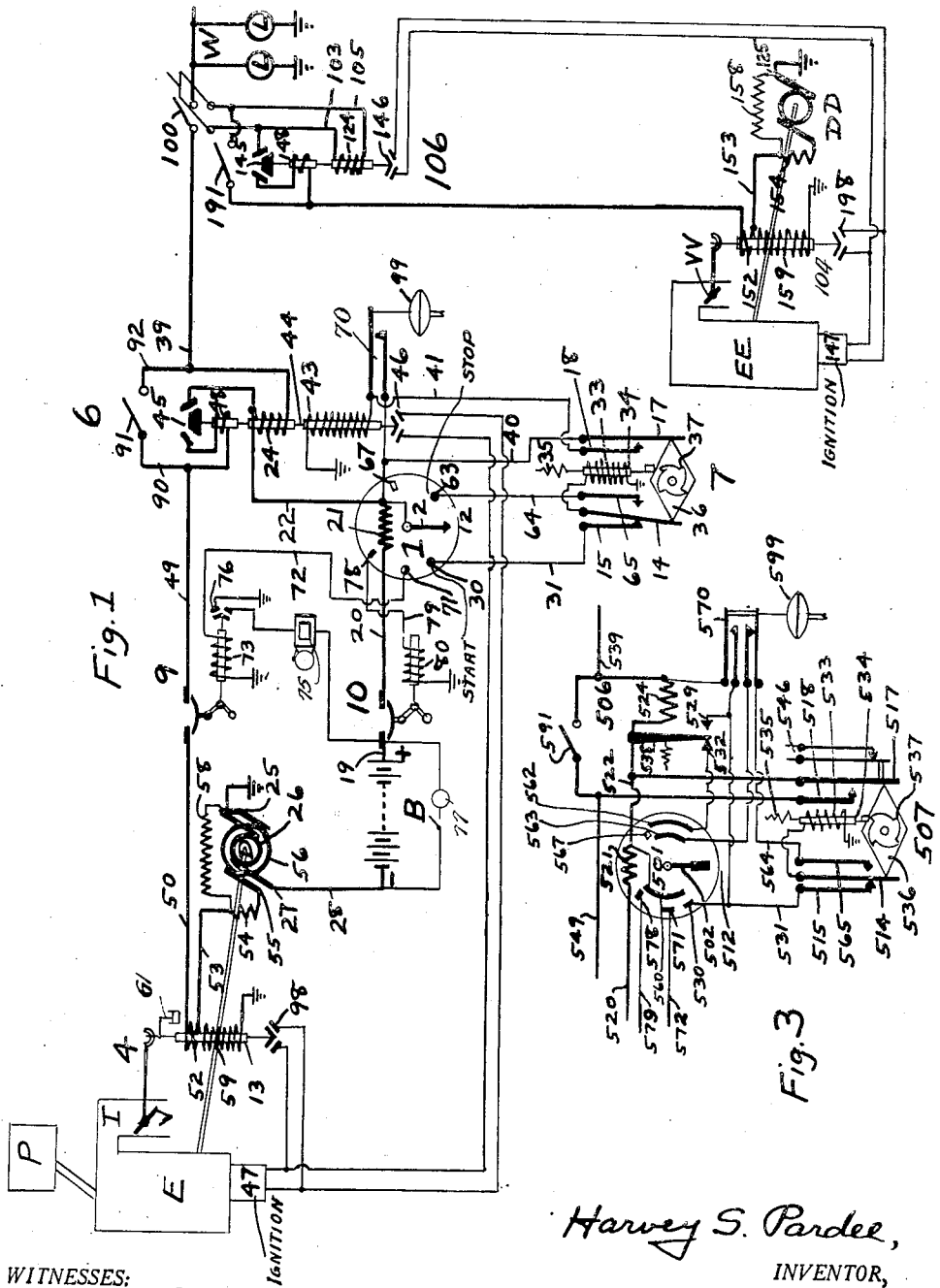

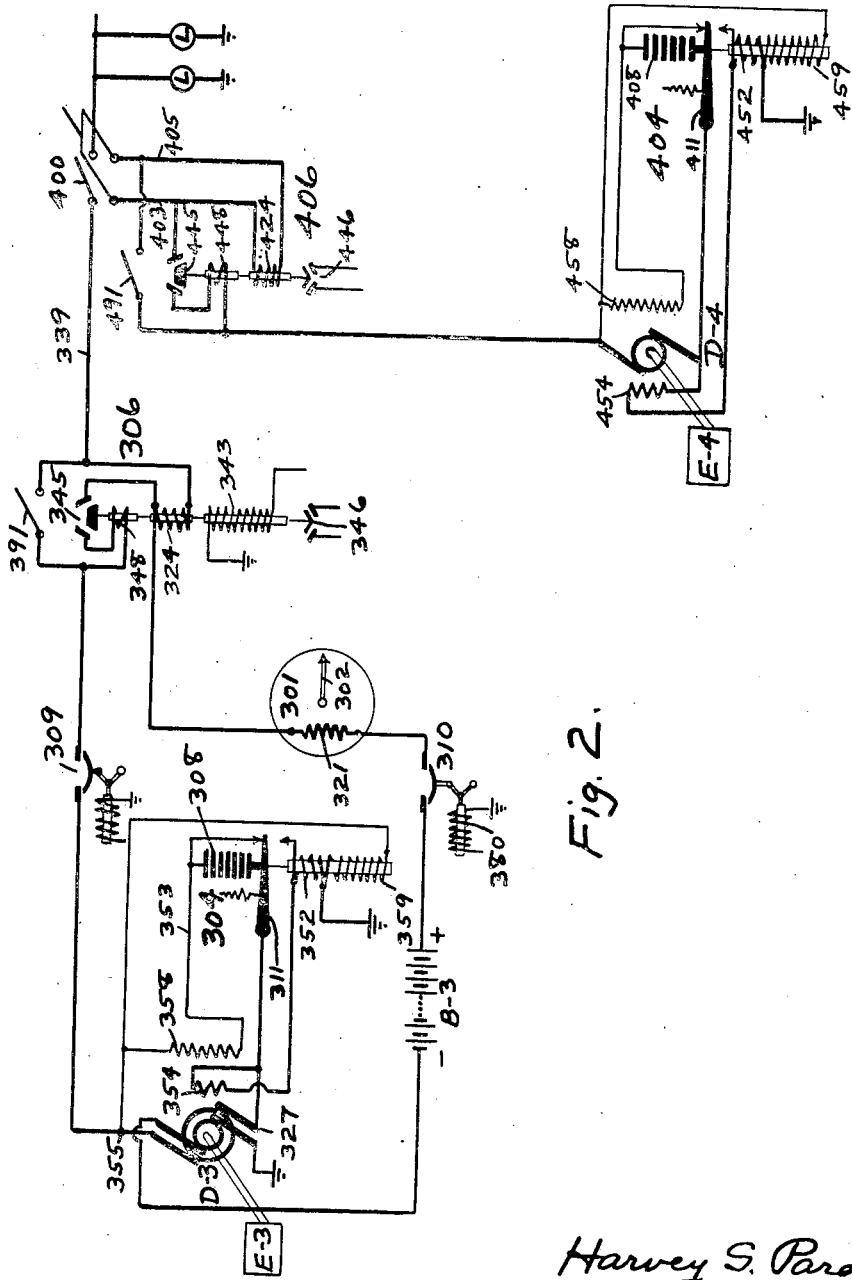

1,515,166

UNITED STATES PATENT OFFICE.

HARVEY S. PARDEE, OF CHICAGO, ILLINOIS.

ELECTRICAL SYSTEM.

Application filed April 20, 1916. Serial No. 92,421.

*To all whom it may concern:*

Be it known that I, HARVEY S. PARDEE, a citizen of the United States, and residing at Chicago, in the county of Cook and State of Illinois, have invented a new and Improved Electrical System, of which the following specification is a full disclosure.

This invention relates to an electrical system, and with regard to certain more specific features, to a power plant embodying an internal combustion engine, a dynamo connected therewith, a work circuit and a storage battery.

One of the objects of the present invention is to provide an electrical system constructed of parts easily obtained on the market, readily assembled, and capable of operation for an extended period without expert attention.

Another object is the provision of simple, durable and efficient apparatus for furnishing current to a work circuit by means of a generator driven by an internal combustion engine, or other engine, inherently incapable of starting itself.

Another object is the provision of a system of the above type in which a small storage battery may be effectively employed, in place of the large battery now commonly in use, the present system affording automatic operation, accuracy of regulation, and protection to the battery.

Another object is the provision of an efficient and inexpensive charging system for a storage battery, so designed that the generator may supply the lamps and charge the battery simultaneously, without subjecting the lamps or other translating devices, to a voltage higher than the normal discharge-voltage of the battery.

Another object is the provision of apparatus of the above type in which notice is automatically given to the operator in case his attention is needed at any time, and this prior to any disconnection of the lamps from their source of current.

Another object is the provision of reliable and efficient means for controlling the operation of a pumping plant. Other objects will be in part obvious from the annexed drawings and in part indicated in connection therewith by the following analysis of this invention.

This invention accordingly consists in the features of construction, combinations of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting diagrammatically a preferred form have been annexed as a part of this disclosure, and in such drawings, like characters of reference denote corresponding parts throughout all the views of which:—

Figure 1 is a diagrammatic representation of an electrical system incorporating certain features of the present invention;

Figure 2 is a modification, illustrating a control for the field-current of the generator.

Figure 3 is another modification.

In considering the relation of this invention to the prior art, it may be noted that for many years there has been a demand for an electrical system in which a work circuit, for lamps, motors, or other translating devices, could be supplied with current from a dynamo driven by an internal-combustion engine, with provision for furnishing a small amount of current as for night-lights, without requiring the operation of the engine and generator at such times; a further requirement has been that the entire system should be sufficiently automatic that no frequent or expert attention is needed, durable so that no expert inspection or repair would be required for long periods of time, and inexpensive both as regards first costs and operating costs, so that the system is commercially applicable to small, isolated installations. In many, if not all of the present-day apparatus designed for isolated power plants, the first cost and depreciation of the storage battery is a large factor in the total expense incident to the purchase and maintenance of the plant. As the description of the present invention proceeds, it will be seen that these rigid requirements have been met, in an apparatus which is at once inexpensive, automatic, efficient and reliable.

Briefly, the present invention utilizes a combined generator and battery-charging booster which supplies a voltage to the line equal to the discharge voltage of the battery and an excess charging voltage to the battery greater than the voltage supplied to the line, whenever the generator is running normally. When the generator is not running, the booster armature winding of the combined generator remains in the battery circuit but generates no voltage because it is at rest. There is preferably provided an ampere-hour meter with certain contacts and electrical connections to a main switch which operate that switch and automatically start up the plant and shut it down at the proper times, depending upon the state of charge of the battery. The main switch is arranged also to close automatically and start up the plant whenever the lamp load draws a current in excess of the capacity of the battery, which in this case may be relatively small. The main switch automatically opens when the lamp load drops down below the capacity of the battery and the battery has reached a state near full charge. Various auxiliary devices may be added to protect the apparatus, give an alarm, and to cut off the engine-starting circuit when the engine fails to start with reasonable promptness, due to the failure of the fuel supply or other abnormal causes, and to shut down the engine when faults develop in the control mechanism. The driving engine is of the variable-speed type and is preferably so regulated as to run at a higher speed at full load than at no load, thus tending to maintain a more constant mixture and a saving of fuel. The battery, it should be noted, is of small capacity and relatively high internal resistance and thus is subject to a considerable drop of voltage during the momentary rush of current at the first instant of starting the engine.

This fluctuation of the lamp voltage and candle-power has the advantage of giving a distinct warning to the operator whenever the engine is started.

Referring now to the accompanying drawings, and more particularly to Figure 1, thereof, there is illustrated at I a portion of the intake of an internal-combustion engine E; a butterfly or other valve V is located in the intake I and is adapted to be operated by means hereinafter described, so as to increase the fuel supply to the engine at certain times and to move in the opposite direction to decrease the fuel supply at other times. Mechanically connected to the engine E is a dynamo-electric machine D, which is utilized as a motor to start the engine and when the engine is running is utilized as a generator to furnish current to the storage-battery B and to the work circuit W.

An integrating meter 1, preferably an ampere-hour meter as here illustrated, has a contact-making pointer or other indicator 2 which indicates the state of charge of the battery B and, in addition, effects certain circuit-changing operations hereinafter described. A valve-operating regulator 4, a main switch 6, a relay 7, a dynamo trip-switch 9 and a battery trip-switch 10, may also be provided.

The structural details of the various elements and their assembly perhaps can be best described in connection with an explanation of the various operations and circuit changes that occur in the several phases or events of the cycle of operations of the system. Assume, therefore, that the engine and dynamo are at rest, that no current is flowing in the work circuit and that the battery is in a state of partial charge such that the indicator 2 of the meter 1 stands at point 12. At this time the switches 9 and 10 are closed, the main switch 6 is open (down), the regulator 4 is in its open-throttle position (core of solenoid 13 down) and the relay 7 is in the position indicated in Figure 1, with the left hand movable contactor 14 thereof contacting with its left-hand contactor 15, and the right hand movable contactor 17 of the relay is separated from its contactor 18. If now a lamp load of less than, for example, one ampere, be turned on in the work circuit W, then current will flow from the positive side of the battery B, through the lead 19, battery trip-switch 10, lead 20, coil 21 of the meter 1, lead 22, lamp-current coil 24 of the main switch 6, thence through any lamps L, L, that are turned on, thence to the ground, from ground to the grounded terminal 25 common to the two armature windings of the dynamo D, through the low-voltage armature winding 26, negative brush 27 thereof, and lead 28, to the negative pole of the battery. The flow through the armature winding 26 encounters none but ohmic resistance since the dynamo is at rest and the field excitation dead. This lamp load causes a slow discharge of the battery and consequently a slow clock-wise movement of the indicator 2, which, moves toward the start-charge contact 30.

When the indicator 2 reaches the contact 30, a circuit is closed from the positive side of the battery, through elements 19, 10, 20, 21, 2, 30, lead 31, left-hand fixed contact 15 of the relay 7, left-hand movable contact 14, coil 33 of the relay 7, ground, elements 25, 26, 27 and 28 to the negative pole of the battery. This energizes the relay coil 33, which thereupon pulls downwardly its solenoid-core 34 against the pull of the retractile spring 35, and this downward stroke of the core 34 imparts to the diamond-shaped spacing-block 36 a quarter-turn, through the ratchet 37. This rotation of the spacing-block 36 breaks the relay circuit at the contactors 14, 15, de-energizing the relay winding 33 and allowing the plunger 34 to be withdrawn upward by its spring 35, into position for another throw. At the same time the contacts 14—65 and 17—18 are closed. The contactors 17—18 close a circuit from the positive side of the battery through elements 19, 10, 20, 21, lead 40, right hand movable contact 17, contact 18, lead 41, voltage coil 43 of the main switch 6, ground, elements 25, 26, 27 and 28 to the negative side of the battery. This energizes the voltage coil 43 of the main switch, which thereupon pulls upwardly its solenoid-core 44, with sufficient force to close the main contacts 45 of the switch 6.

At the same time, the contacts 46 are separated to remove a short-circuit around the engine magneto 47, or,—depending upon the style of ignition used for the engine,—the circuits might be altered so that the upward movement of the core 44 would close the ignition circuit; in either case, the auxiliary contacts 46 are intended to render the engine ignition operative when the core 44 is raised and inoperative when the core is in its lower position.

The effect of closing the main contacts 45 is to close a circuit from the positive side of the battery, through elements 19, 10, 20, 21, 22, 45, dynamo-current coil 48 of the main switch 6, lead 49, dynamo trip-switch 9, lead 50, current coil 52 of the regulator 4, lead 53, series field 54 of the dynamo D, positive brush 55, high voltage armature winding 56, intermediate or grounded terminal 25, low-voltage winding 26, brush 27, and lead 28 to the negative side of the battery.

Simultaneously the shunt-field winding 58, connected to lead 53 and ground 25, and the voltage coil 59 of the regulator 4, connected to the same points, are energized; these coils are for the moment energized, but slightly however, owing to the heavy ohmic drop in the battery. A strong current flows through the circuit including the armatures and series field of the dynamo, causing the dynamo to rotate as a series motor, with a large starting-torque; this rotation of the dynamo rotates the engine E through the mechanical connections between them, and this serves to start the engine. The current through the current coil 48 of the main switch at this time tends to close the main contacts 45 thereof more tightly, thus securing a firm and positive contact.

After the engine has started to rotate under its own power, the counter electromotive-force generated in the armature windings 26, 56, raises the voltage across the terminals of the dynamo, thereby increasing the power of the coil 59 and shunt field 58 and reducing the current in the series field 54, until the dynamo voltage equals and then exceeds the battery voltage. Then the series field reverses, and thereafter, during the operation of the dynamo as a generator, the series field opposes the effect of the shunt field. The series field is preferably strong enough relatively to the shunt field to afford a marked drooping of the dynamo-voltage characteristic (based on constant speed). This characteristic permits higher speed at full load than at light load, with constant voltage.

Now that the engine is running under its own power, current is delivered from the positive lead 53 of the dynamo through the elements 52, 50, 9, 49, 45, 48, and thence in two branches. The first branch includes the lamp-current coil 24, main 39, lamps L, L, ground, and grounded terminal 26 of the dynamo, giving at the lamps a voltage equal to the voltage across the high-voltage winding 56 of the dynamo; in practice this is preferably 110 volts, although obviously any other suitable standard of voltage may be used. The second branch includes the elements 22, 21, 20, 10, 19, thence through the battery to charge the same, thence through low-voltage or booster winding 26 of the dynamo, to the grounded terminal 25 of the dynamo; so that the voltage across the battery is at this time equal to the sum of the voltages across the two windings 56, 26, of the dynamo. The high-voltage winding carries preferably a pressure of 110 volts, and by proportioning the low-voltage winding for, say, approximately 14 volts, the battery on charge receives 124 volts at its terminals, which is a suitable charging voltage for a lead battery whose discharge voltage is 110; however, these proportions may naturally be varied to meet the requirements of the particular battery to be used.

The dynamo voltage is maintained constant by suitable means such as the regulator 4, whose core 13 is pulled upwardly in case of a tendency to excessive voltage across the coil 59, to move the valve V toward its closed position, thereby reducing the fuel supply and speed of the engine and consequently restoring the dynamo voltage to its normal value. Similarly a slight reduction or tendency to reduction of the voltage causes a lessened power of the coil 59, which allows the solenoid core 13 to drop slightly, thereby opening the valve, admitting more fuel, speeding up the engine and dynamo, and restoring the voltage to normal. By means of this regulator, then, the dynamo-voltage characteristic is determined so that despite changes in load, or the condition of the battery or other variables such as temperature and quality of fuel, the voltage on the load is not affected. It is possible by means of the compound winding on the regulator to give a rising characteristic to the dynamo voltage in order to compensate for voltage drop in the line leading to the lamp load. The compounding is effected by the current coil 52, which carries the output current of the dynamo and during normal operation opposes magnetically the potential winding 59, by properly proportioning the ratio of ampere-turns on the current and the potential windings 52, 59, it is possible to give a flat, a rising, or a falling characteristic to the voltage across the work circuit. This regulator may thus be made to compensate for the inherent drooping characteristic of the dynamo as well as for other conditions, such as line drop. It is preferably equipped with a dashpot 61 or other suitable damping means to prevent hunting or over-regulation during ordinary load fluctuations and sudden closing of the valve due to the strong action of the current coil at the instant of starting the engine.

As the charging of the battery progresses, the meter indicator 2 moves counter-clockwise. When the indicator reaches the stop-charge contact 63, a circuit is closed from the positive main 49 of the dynamo circuit, through elements 22, 2, 63, 64, contactors 65 and 14 (closed as previously explained), coil 33 of relay 7, to ground. This energizes the relay coil 33, which thereupon pulls downwardly its solenoid core 34, imparting a quarter-turn through the ratchet 37, to the diamond-shaped spacing block 36. This rotation of the spacing block 36 breaks the circuit at the contactors 65, 14 and opens the circuit at the right hand contactors 17, 18. The break at 65, 14, opens the circuit through which the relay had been previously energized, thus allowing the plunger 34 to be withdrawn by the spring 35 into position for another throw. The separating of the contactors 17, 18, opens the circuit through the voltage coil 43 of the main switch 6, and causes the switch to open its main contacts 45, and assuming still that the lamp load is one ampere or less, the current coil 48 being of insufficient strength to hold the main switch 45 closed at this time. This de-energizes the voltage coil 43 and closes the auxiliary magneto contacts 46. The opening of the main contacts 45 disconnects the dynamo from the battery and work circuit; the closing of the auxiliary contacts de-energizes the engine ignition and causes the engine to stop. The conditions previously assumed are now restored, namely, the battery is on slow discharge and supplies the one ampere or less that is required for the work circuit. As the battery slowly discharges, the meter pointer 2 reaches again the start-charge contact 30, and the cycle above described is repeated. An object of the relay 7 is to relieve the contacts on the meter 1 of the duty of carrying the current and breaking the inductive circuit through the voltage coil 43 of the main switch.

If at any time the current in the work circuit rises above, say, one ampere when the dynamo is not running, the starting of the dynamo is effected at once, without waiting for the battery to discharge to the state indicated by the start-charge contact 30 on the meter. This immediate starting of the engine is effected through the lamp-current coil 24 on the main switch; this coil, when energized with more than, say, one ampere of current, raises the core 44 of the main switch, 6, after which the starting of the dynamo is effected as in the preceding instance, where the core 44 was raised by means of the voltage coil 43. If now the lamp remains more than one ampere and the battery becomes sufficiently charged to cause the indicator 2 to reach the stop-charge contact 30, the relay 7 will shift the diamond-shaped spacing-block to its Figure 1 position, as in the preceding case when the lamp current was less than one ampere. In the present case, as formerly, this operation of the relay 7 de-energizes the voltage coil 43 of the main switch, but the core 44 thereof does not drop, because there is more than one ampere of current in the lamp-current coil 24, and this coil is thus energized sufficiently to keep the main switch closed even though the voltage coil 43 is de-energized. The charging of the battery continues, but at a decreasing rate, because the counter electromotive-force of the battery is increasing, and the impressed voltage (from the dynamo) is constant. As the charging progresses, the meter indicator rotates further counter-clockwise, until it reaches the stop 67, indicating full charge, possibly an overcharge. Further movement of the meter indicator is prevented by this stop; this does no harm to the meter, and serves to indicate that the battery is fully charged, and also tends to insure that the indicator of the meter is in harmony with the condition of the battery, by preventing any over-charge-current (which would not raise the state of charge of the battery) from turning the meter pointer counter-clockwise. Then, when the lamp current falls below one ampere, the lamp-current coil 24 permits the core 44 to drop, thereby opening the main switch 45, disconnecting the dynamo from the battery and lamps, and de-energizing the engine ignition to stop the engine. The coil 48 at this time is not strong enough to hold the switch 45 closed. The reason for separating the stop-charge contact 63 and full charge stop 67 by an interval determined by the constants of the system, is that the charging current tapers off markedly toward the end of the charge and considerable time is required for the indicator to move over this part of its travel. If the stop-charge contact 63 were at a point representing full charge, the engine would be kept running a long time with an insignificant current and consequently low efficiency. It is preferable, to place this stop-charge contact 63 at a point representing about eighty to ninety per cent of full charge and to depend upon the exigencies of load conditions to run the engine long enough to effect a complete charge and occasionally a desirable overcharge of the battery; this will bring the indicator 2 up against the stop 67 and when the battery next goes on discharge the meter will be exactly in step with it. It will thus be seen that the engine is started at any time when the lamp current exceeds one ampere and remains in operation as long as the lamp current remains above that value, and supplies current to the lamps and to the battery; and that with the lamp current less than one ampere, the engine is started automatically when the battery becomes sufficiently discharged, and is automatically stopped when the charging has progressed to a predetermined extent. It will be clear, moreover, that when the dynamo is at rest the lamps are supplied from the battery through a circuit including the low-voltage winding of the dynamo, which, however, offers at this time only an ohmic resistance to the passage of the current therethrough, since the armature is not rotating and the field is not energized; on the other hand, when the dynamo is in operation, the battery is charged at a constant voltage equal to the sum of the voltages across both of the dynamo armature windings, while the lamps are supplied from the high-voltage winding only, and at a constant voltage equal to the discharge voltage of the battery. In this way, the lamps receive the same voltage whether the battery is on charge or discharge, the battery receives on charge a constant impressed voltage in excess of its discharge voltage, and the ratio of charge to discharge voltages may be predetermined to meet the characteristics of the battery by properly proportioning the relative voltages of the two armature windings of the dynamo. Again, the regulator provided for the purpose of maintaining a definite voltage characteristic, operates directly upon the fuel supply to the engine, thus avoiding the losses and complication incident to other types of regulation; and by suitable proportioning of the voltage and current coils of this regulator the engine is caused to run at a higher speed at full load than at light load, thereby effecting an engine operation conducive to fuel economy, since at full load, when more gasoline is to be taken into the engine, a higher speed is advisable in order that the proper proportion of air may be mixed with the gasoline vapor.

So much for the normal operation of the system. It happens occasionally that the dynamo will fail to start the engine, through engine trouble, or lack of fuel, or other causes. In such a case, the battery discharges rapidly, owing to the heavy current flowing through the dynamo, and this causes the meter indicator 2 to travel clockwise until it reaches the contact 71; this closes a circuit from the positive side of the battery, through the elements 19, 10, 20, 21, 2, contact 71, lead 72, coil 73 of the dynamo trip-switch 9, ground, and elements 25, 26, 27 and 28, to the negative side of the battery. This energizes the coil 73, which opens the trip-switch 9, thereby disconnecting the dynamo from the battery and lamps, and protecting the battery from further discharge through the dynamo. At the same time, an alarm circuit may be closed either by the closing of the circuit at 2, 71, or by the movement of the trip-switch 9 to its open-circuit position; the latter device is illustrated conventionally as comprising the bell 75, the contacts 76 adapted to be closed when the switch 9 is open and connections to battery and to ground; this bell would naturally be located within hearing distance of the operator, and would continue to ring, using a negligible amount of current from the battery, until the operator responds to the warning. An additional warning, inherent in the apparatus, consists in the decreasing voltage and candle-power of the lamps as the rapid discharge of the battery causes its voltage to drop to a marked extent. It will be noted that this opening of the dynamo trip-switch 9 does not disconnect the lamps from the battery, so that the operator has the use of the lighting circuit for locating the trouble, and the work circuit is available for illumination and other purposes. If the battery discharges still further before the trouble is removed, the battery is prevented from being permanently damaged, by another safety device, comprising the battery-trip contact 78, which is engaged by the meter indicator 2 when the latter has moved clockwise far enough to indicate a nearly-discharged condition of the battery. When the indicator reaches this contact 78, a circuit is closed from the positive side of the battery, through elements 19, 10, 20, 2, contact 78, lead 79, coil 80 of battery trip-switch 10, ground, and elements 25, 26, 27 and 28, to the negative side of the battery. This energizes the coil 80, which opens the battery trip-switch 10, thereby disconnecting the battery from the lamps and preventing any further discharge of the battery, except possibly the small current needed for the alarm circuit, 75, 76 and for a trouble lamp 77 if these circuits are connected to the battery side of the switch 10. Contact 78 also serves as a mechanical stop to the meter movement.

As an emergency device the hand-controlled switch 91 is provided, which in connection with the leads 90 and 92 is arranged to short-circuit the main switch 6 and eliminate its use in connection with the system whenever it becomes inoperative for any reason or is removed for repairs. By the use of this emergency switch 91, it is possible to continue the operation of the system non-automatically whenever trouble develops in the control mechanism.

As a protective device to prevent the wide opening of the throttle V whenever the coil 59 or its connections should open-circuit for any reason, tending thus to cause the engine to run away, there is provided a system of contacts and connections 98, which render the engine ignition inoperative when the switch is de-energized, thus operating in a manner similar to the operation of the main switch 6 and its auxiliary contacts 46.

In order to prevent the opening of the dynamo trip-switch 9 when the pointer is approaching the contact 71 in a counter-clockwise direction, the contact 71 is insulated on its left hand side so that the indicator slides by it without making electrical contact with it when approaching it from the left (counter-clockwise), but does make electrical contact when approaching from the right, (clockwise), that is, when the battery is discharging.

The description thus far has been directed to a system utilizing a single engine. In certain instances, it is more economical to divide the power supply of the plant among two or more units, and to have one of these units of larger capacity than the other: For example, in a typical installation a lamp load of one ampere or less would be supplied by the battery alone; the ordinary day load of, say, fifteen amperes, would be supplied by a small engine such as the engine E, driving the double-voltage dynamo D, at approximately its full-load rating; a maximum load, of, say, fifty amperes, would be carried by a larger engine EE and dynamo DD, running either alone or in parallel with the smaller unit E, D. This is conducive to efficiency of fuel consumption, because the units then operate at approximately full load, whereas an internal combustion engine running at low loads is relatively inefficient.

If a second engine EE and single voltage dynamo DD are to be added to the plant above described, the switch 100 in the work circuit is opened, and to its terminals are connected the leads 103, 105. A preferred arrangement of parts is indicated in Figure 1 as comprising shunt and series windings 158, 154, to the junction of which is connected the lead 153 to the current coil 152 of the engine-regulator 104, thence to the dynamo-current coil 148 of the main switch 106, to the lead 103 above described. A manual switch 191 is provided in shunt to the main switch 106, which is also provided with auxiliary contacts 146 so designed as to render the engine ignition inoperative when the main switch 106 is de-energized. A voltage coil 159 on the regulator solenoid 113 is connected across the lead 153 and ground. The lamp current coil 124 of the main switch 106 is connected across the leads 101, 102, and carries lamp-current except when the manual short-circuiting switch 191 is closed; this switch 191 is used, however, only when the main switch 106 is out of order. In operation, when the lamp current exceeds fifteen amperes, the lamp-current coil 124 of the main switch is energized sufficiently to close the switch, whereupon current from the dynamo D flows through the dynamo DD to start the latter and after the engine EE has begun to rotate under its own power, the dynamo DD assists in carrying the load of the work circuit.

The division of load between the two machines depends to a certain extent upon the design and adjustment of the regulators 4 and 104. This adjustment may be arranged to cause the unit EE, DD to assume all of the load when first cut in and thus cause the main switch 6 to open and shut down the smaller unit D, E until such time as the lamp load exceeds the capacity of the unit EE, DD and causes a current greater than one ampere to flow from the battery, when the main switch 6 closes and starts the unit D, E in the usual manner. Or the regulators 4 and 104 may be so adjusted that when both units are running the division of load is at all times proportioned to the capacities of the respective units. Whenever the lamp-current drops to a predetermined extent, below the assumed standard of fifteen amperes, the coils of the main switch 106 allow the switch 106 to open, thereby disconnecting the dynamo DD from the load, and leaving the circuits in the condition in which they were before the lamp load first exceeded the standard of fifteen amperes; that is, the small engine E remains in operation, driving the small dynamo D to supply the lamps and charge the battery B.

It is obvious that the different units previously described need not be of unequal size.

The engine E may be connected to drive a pump, preferably provided with a diaphragm or other type of valve 99 arranged so that when the pressure on the valve falls below a predetermined minimum, the valve will close the contacts 70, causing the voltage coil 43 of the main switch 6 to be energized, thereby closing the main contacts 45 and opening the ignition contacts 46, to start the engine independently of the magnitude of the lamp load or the condition of the battery, thus providing a pressure-controlled pump-starting apparatus. The pump is preferably provided with suitable means (not shown), such as a by-pass valve, acting as an automatic unloading device to prevent excessive pressure.

As a modification of the system illustrated in Figure 1 and described above, there is shown on Figure 2 of the drawings a system in which the regulation of the dynamo voltage is effected by varying the current in the shunt field. In Figure 1, the speed of the engine was taken care of by the regulators 4 and 104. In Figure 2, however, the regulators 304 and 404 do not act directly upon the engine, and it is therefore advisable to provide suitable mechanical governors (not shown) to maintain fairly constant the speed of the engines $E^3$ and $E^4$. The engine $E^3$ is mechanically coupled to the double-voltage dynamo $D^3$, whose armature windings are connected as in Figure 1, but whose field connections are somewhat differently arranged; the shunt field 358 is in the circuit from the positive dynamo terminal 355, through the shunt field, then through the carbon pile 308 to the negative dynamo terminal 327. The series field 354 is connected to the negative dynamo terminal 327 and to ground, through the current coil 352 of the regulator 304. The regulator arm 311 when in its uppermost position (regulator coils 352 and 359 de-energized) serves to short-circuit the carbon pile 308, so that at this time the shunt field 358 is connected directly across the high-voltage armature winding of the dynamo. As the regulator coils 352 and 359 pull downwardly upon the arm 311, this short-circuit around the carbon pile 308 is removed, and thereafter the downward movement of the arm 311, in response to the increasing pull of the coils 352 and 359, lessens the pressure upon the elements of the carbon pile 308, increasing the resistance of said pile and consequently progressively weakening the shunt field 358. When the regulator arm 311 lowers still further and just about the time the engine picks up and the series field reverses, another contact is made, serving to short-circuit the series field 354 of the dynamo.

The voltage coil 359 of the regulator is connected between the positive dynamo terminal and ground, and thus receives the full voltage supplied to the lamps. The series coil 352 of the regulator cooperates with the voltage coil 359 to give any desired voltage characteristic to the system, as indicated above in connection with the coils 52 and 59 of the regulator 4. Dynamo trip switch 309 and battery trip switch 310, as well as the other elements of the system not otherwise identified here in detail, correspond in structure and operation to the analogous elements of the system illustrated in Figure 1. The starting and stopping of the engine $E^3$, due either to the condition of the battery or to the magnitude of the lamp load, occurs as in Figure 1 and the same is true of the operation of engine $E^4$ and the cooperation between the two units $D^3$, $E^3$ and $D^4$, $E^4$. For convenience, the various elements associated with the unit $D^3$, $E^3$, are assigned reference numerals three hundred higher than the corresponding elements of the unit D, E, and the elements associated with the unit $D^4$, $E^4$, are indicated by reference numerals four hundred higher than the analogous elements of the unit D, E, and three hundred higher than the analogous elements of the unit DD, EE.

In view of this explanation, it is believed that the structural features of mode of operation of the system illustrated in Figure 2, will be clear without further elaboration.

The systems above described may be modified by altering the meter 1, main switch 6, and relay 7, which, except for the system of contacts on the meter 1, results in a material simplification of the control apparatus. That part of the system involving these modifications is shown in Figure 3, and those elements of Figure 3 that correspond to elements in Figure 1, are given numerals five hundred higher than in Figure 1. The modification shown in Figure 3 eliminates the contacts 45 of the main switch 6 and substitutes therefor the contacts 517 and 518 on the relay 7, made sufficiently heavy to carry the lamp load. The ignition contacts 546 are also incorporated in the relay 507 and perform the same functions as the contact 46 of Figure 1. On the meter 501, the contact indicator 502 is an insulated member with contact brushes arranged to bridge across two contact segments each time a connection is made. The segment 560 is connected to the positive battery through the lead 520. The segments 563, 530, 571 and 578 are connected in the same way as the contacts 63, 30, 71 and 78 respectively. The relay 506, consisting of the winding 524 in series with the lamp load and the armature 538 with its contacts 532 and 529, take the place of the main switch 6 in Figure 1.

The operation is as follows: Assume the engine and dynamo at rest and no current flowing in the work circuit and the battery in a state of partial charge such that the indicator 502 of the meter 501 stands at the point 512. At this time the winding 524 of the 506 is dead, with the armature 538 in its retracted (left-hand) position making contact with the contact 532 connected to the meter segment 562. The relay 507 is in the position indicated in Figure 3, with the left-hand movable contactor 514 contacting with its left hand fixed contactor 515, and the right hand contactors 517 and 518 (in series with the dynamo circuit) are separated. If now a lamp load less than, for example, one ampere, be turned on in the work circuit W, then current will flow from the positive side of the battery (not shown) through the lead 520, coil 521 of the meter 501, lead 522, lamp-current coil 524 of the main switch 506, to the lamp load, and thence as described above in connection with Figure 1. This lamp load causes a slow discharge of the battery and consequently a slow clock-wise movement of the indicator 502 which moves towards the start-charge contact 530. When this point is reached a circuit is made from the positive side of the battery through lead 520, coil 521, segment 560, contacting bridge of 502, to contact 530, thence to contactors 515, 514 and winding 533, energizing the latter and rotating the spacing-block 536 through a quarter-turn, thereby opening the circuit of the winding 533 at the contacts 514 and 515, closing the dynamo circuit at the contacts 517 and 518, and opening the ignition short-circuit at the contacts 546. The dynamo is started up, and the load and battery charging are supplied from the dynamo in the manner described above in connection with Figure 1.

The indicator 502 now moves counter-clockwise as the battery is charged, and when it reaches the stop-charge contact 563 a circuit is made through lead 520, coil 521, lead 522, armature 538, contact 532, segment 562 across the bridging piece of the indicator 502, segment 563, lead 564, contactors 565 and 514, which were joined by the preceding operation of the relay 507; thereby energizing the winding 533, rotating the spacing block 536 another quarter-turn into the position shown in Figure 3, cutting off the dynamo circuit and rendering inoperative the ignition circuit of the engine by means of the contacts 546.

If at any time the current in the work circuit rises above, say, one ampere, when the dynamo is not running, the starting of the dynamo is effected at once without waiting for the battery to discharge to the state indicated by the start-charge contact 530 on the meter. This immediate starting of the engine is effected through the lamp-current coil 524, which, when energized with more than one ampere of current, attracts the armature 538, breaking the contact at 532 and making contact at 529. This completes a circuit through the elements 520, 521, 522, 538, 529, 531, 515, 514, 533, operating the relay 507 in the same manner and with the same results as previously described. When the lamp current in the coil 524 falls to a point below one ampere, the coil 524 is de-energized and contact 529 broken, contact is made at 538, 532, but no further action results unless the contact bridge of the indicator 502 is at some point bridging the contact segments 562, 563; in such a case the coil 533 of the relay 507 is energized and operates to open the dynamo circuit as above described.

It will thus be seen that in order to shut down the engine the lamp load must be less than one ampere and the battery must be in a state of charge represented by the indicator 502 somewhere on the segment 563; on the other hand, the conditions for starting up the engine when it is shut down are either that the battery is partially discharged or that the line current is greater than one ampere. It is thus impossible at any time for these conditions to conflict and the control relay 507 to attempt to start and stop the engine at the same time. Comparing the system shown in Figure 3 with that of Figure 1, it will be noted that the relay 506 has a comparatively light duty to perform and can be made more sensitive to adjustment and can be readily designed to open and close at current values very nearly the same. The winding 48 is eliminated, and the coil 524 is smaller and of less resistance than the coil 24. The dynamo circuit also is held open or closed by means of an insert spacing block instead of a constant magnetic pull. It may also be less expensive to construct a quick-break switch by means of the contacts on the relay 507, or a drum or commutator switch performing the same duty, than it would be on a switch of the type shown at 6, Figure 1. And these advantages may well compensate for the complication of the meter 507. If, for any reason the relay 507 fails to operate automatically, it may readily be rotated manually by a suitable handle or thumb piece (not shown) to start and stop the engine.

If in connection with the system shown in Figure 3, it is desired to add an additional engine-driven unit such as the unit DD, EE, Figure 1, the connections are made in an analogous manner. The contact 529 is connected to the contactor 515, and the contact 532 is connected to the contactor 565, and the leads 539 and 549 are connected in series with the work circuit.

In the embodiment of the invention illustrated in Figure 3, the engine $E^5$ (not shown) may be connected to drive a pump (not shown); a diaphragm or other valve 599 may be provided, therewith similar to the valve 99 of Figure 1. The valve 599, at a predetermined minimum pressure, operates a two-position key 570 to open the engine-stopping relay circuit through the lead 564, so that the engine-stopping circuit is rendered inoperative even though the battery be full and the lamp load less than one ampere; shortly after opening this circuit, the key closes the engine-starting relay circuit through the contacts 515 and 514.

From the above, it will be seen that the several objects of the invention are achieved, and other advantageous results attained.

As various changes might be made in the above construction, and as the above invention might be embodied in different forms, it is intended that all matter set forth in the above description and in the accompanying drawings, shall be interpreted as illustrative and not in a limiting sense.

Having thus revealed my invention, I desire to claim as new and secure by Letters Patent of the United States:

1. An electrical system combining a battery, a work circuit therefor, a dynamo for charging the battery, an engine for driving the dynamo, means for starting the engine when the battery is sufficiently discharged, means for starting the engine when the load in the work circuit exceeds a predetermined minimum, and means for stopping the engine when the current in the work circuit is below a predetermined minimum and concurrently the battery is sufficiently charged, said means for starting the engine upon battery discharge and said engine stopping means including a relay comprising a solenoid actuated spacing block actuated in one direction.

2. An electrical system combining an engine, a dynamo adapted to run as a motor to start the engine and to be run as a generator by the engine, a battery, a work circuit supplied by the dynamo during generation, and supplied at other times by said battery, a switch connecting the dynamo to said battery and to said work circuit, a work-circuit-current coil upon said switch to close the switch when the work-circuit-current exceeds a predetermined value, and a dynamo-current-coil upon said switch to hold the switch-contacts tightly closed.

3. An electrical system combining an engine, a battery, a dynamo adapted to be run from the battery to start said engine and to be driven by the engine to charge the battery, a work circuit furnished with current from the battery, a meter provided with a member movable in accordance with changes in the state of charge of the battery and adapted to engage a stop-charge contact operative at less than full-charge condition of the battery, means operated by said member to cause the dynamo to start the engine and stop it according to the state of charge of the battery, and a stop device to arrest the movement of said member during battery charge, when the full-charge position of said member has been reached, whereby further charging current serving to overcharge the battery will not cause further movement of said member.

4. The combination with a battery of an integrating meter combining an indicator, motive means therefor controlled by changes in the state of charge of said battery, a contact device operated by the indicator at a predetermined state of charge of the battery below full charge, means controlled by said contact device for arresting the charge, and a stop device for arresting further movement of the indicator in a battery-charging direction when the motive means has moved the indicator in a battery-charging direction to the position corresponding to full-charge.

5. An electrical system combining a battery, a dynamo, an engine coupled thereto, a switch for connecting the battery to the dynamo to start the engine, a coil for operating the switch, a relay for energizing said coil, a coil for operating the relay, the second coil breaking its own circuit as the relay operates.

6. An electrical system combining a battery, a dynamo, an engine coupled thereto, a switch for connecting the battery to the dynamo to start the engine, a coil for operating the switch, a relay movable into one position to energize said coil and into another position to de-energize said coil, a coil for moving the relay alternately into one of said positions and then into the other, and means whereby the movement of the relay into either of said positions de-energizes the second coil.

7. An electrical system combining a battery, a dynamo, an engine coupled thereto, a switch for connecting the battery to the dynamo to start the engine, a coil for operating the switch, a relay for energizing said coil, a coil for operating the relay, a meter comprising a member movable in accordance with changes in the state of charge of the battery, and meter-controlled means for energizing the second coil when the battery charge reaches a predetermined state, the movement of the relay breaking the circuit of the second coil.

8. An electrical system combining a member movable in accordance with the state of charge of a battery, contact means operated by the member to energize a relay coil to start the charging of the battery, and means whereby the relay coil at each of its operations breaks its own circuit, thereby relieving the first contact means of the duty of breaking a circuit, said last named means including a spacing block actuated in one direction and contactor members operated thereby.

9. An electrical system combining a work circuit, a battery, a plurality of units each comprising an engine coupled to a dynamo, a pump driven by one of the units, means for starting said unit to charge the battery, operate the pump and supply the work circuit when the pressure of fluid delivered by the pump attains a predetermined value, or when the work current attains a predetermined value, and means for starting another unit when the work current attains another predetermined value.

10. An electrical system combining a battery, an engine, a dynamo coupled thereto and adapted to be run from the battery to start the engine and to be driven by the engine to charge the battery and supply a work circuit, a voltage regulator for the dynamo acting upon a resistance in the shunt field circuit thereof and short-circuiting the series field thereof when the engine is running under its own power and short-circuiting said resistance when the dynamo is starting the engine, a meter indicating the state of charge of the battery, and meter-controlled means for starting and stopping the engine according to the state of charge of the battery.

11. A dynamo regulator combining a carbon pile in series with the shunt field of the dynamo, a voltage coil tending to separate the carbons of the pile to weaken the shunt field upon increase of voltage, a current coil opposing the voltage coil, means for short-circuiting the pile when the pull tending to separate the carbons is below a predetermined value, and means for short-circuiting the series field of the dynamo when said pull attains a predetermined value.

12. An electrical system combining a dynamo provided with a shunt field and a series field opposing the shunt field when the dynamo is acting as a generator, but aiding the shunt field when the dynamo is acting as a motor, a regulator for the dynamo acting to weaken the shunt field upon increase of voltage and to short-circuit the series field of the dynamo when the dynamo is acting as a generator.

13. An electrical system combining an engine, a battery, a work circuit, a dynamo coupled to the engine and adapted to be run from the battery to start the engine and adapted to be driven by the engine to charge the battery and supply the work circuit, a switching device for connecting the battery to the dynamo and for disconnecting said parts and stopping the engine, said device including a spacing block and contactors adapted to be engaged thereby, a coil for operating the device and adapted to break its own circuit as the device operates, means for energizing said coil to start the engine when the battery is sufficiently discharged, and means for energizing the coil effective to stop the engine when the battery is sufficiently charged and simultaneously the work-circuit load is below a predetermined value.

14. An electrical system combining a battery, a dynamo coupled to an engine and adapted to be run from the battery to start the engine and adapted to be driven by the engine to charge the battery and supply a work circuit, means comprising a member movable in accordance with changes in the state of charge of the battery, a relay comprising a coil adapted to be energized by said member when the battery is sufficiently discharged and a rotatable spacing block adapted upon rotation thereof upon energization of said coil, to effect the connection of battery and dynamo to start the engine, said coil being also adapted to be energized by said member when the battery is sufficiently discharged, to stop the engine.

In witness whereof, I hereunto subscribe my name, as attested by the two subscribing witnesses.

HARVEY S. PARDEE.

Witnesses:
ANNA SCHRADER,
DELOS G. HAYNES.